United States Patent
Reiche, III

(10) Patent No.: US 11,229,845 B2
(45) Date of Patent: *Jan. 25, 2022

(54) GPS RELATED VIDEO GAME

(71) Applicant: Activision Publishing, Inc., Santa Monica, CA (US)

(72) Inventor: Paul Reiche, III, Novato, CA (US)

(73) Assignee: Activision Publishing, Inc., Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/864,027

(22) Filed: Apr. 30, 2020

(65) Prior Publication Data

US 2020/0254346 A1 Aug. 13, 2020

Related U.S. Application Data

(63) Continuation of application No. 12/510,907, filed on Jul. 28, 2009, now Pat. No. 10,675,543.

(51) Int. Cl.
| | |
|---|---|
| *A63F 13/63* | (2014.01) |
| *A63F 13/216* | (2014.01) |
| *A63F 13/79* | (2014.01) |
| *A63F 13/332* | (2014.01) |

(52) U.S. Cl.
CPC ........... *A63F 13/63* (2014.09); *A63F 13/216* (2014.09); *A63F 13/332* (2014.09); *A63F 13/79* (2014.09); *A63F 2300/205* (2013.01)

(58) Field of Classification Search
CPC ...... A63F 13/216; A63F 13/79; A63F 13/332; A63F 2300/205; A63F 13/63
See application file for complete search history.

(56) References Cited

U.S. PATENT DOCUMENTS

| | | | |
|---|---|---|---|
| 6,320,495 B1 | 11/2001 | Sporgis | |
| 6,392,668 B1 | 5/2002 | Murray | |
| 6,691,032 B1 | 2/2004 | Irish et al. | |
| 6,716,103 B1 * | 4/2004 | Eck | A63F 13/02 463/45 |
| 7,435,179 B1 | 10/2008 | Ford | |
| 7,575,518 B2 * | 8/2009 | Tabata | A63F 13/005 463/40 |
| 7,828,655 B2 * | 11/2010 | Uhlir | A63F 13/61 463/30 |

(Continued)

FOREIGN PATENT DOCUMENTS

| | | |
|---|---|---|
| JP | 2001-000745 | 1/2001 |
| JP | 2002-273034 | 9/2002 |
| JP | 2003-190634 | 7/2003 |

OTHER PUBLICATIONS

International Search Report on corresponding PCT application (PCT/US2010/043567) from International Searching Authority (KR) dated Apr. 27, 2011.

(Continued)

*Primary Examiner* — Chase E Leichliter

(74) *Attorney, Agent, or Firm* — Klein, O'Neill & Singh, LLP

(57) ABSTRACT

A real world location information related video game. The video game utilizes real world location information derived from a player's mobile device to associate attributes and entities to game players. The associated attributes and entities may be useful in further game play on a player's mobile device or PC.

12 Claims, 6 Drawing Sheets

(56) References Cited

U.S. PATENT DOCUMENTS

| | | | |
|---|---|---|---|
| 7,967,678 B2* | 6/2011 | Dougherty | A63F 13/10 463/30 |
| 7,970,749 B2* | 6/2011 | Uhlir | A63F 13/65 707/705 |
| 8,028,443 B2* | 10/2011 | Case, Jr. | A43B 3/0005 36/132 |
| 8,595,336 B1* | 11/2013 | Tsern | A63F 13/26 709/221 |
| 2002/0006825 A1 | 1/2002 | Suzuki | |
| 2002/0063655 A1* | 5/2002 | Aoyama | A63F 13/216 342/357.57 |
| 2002/0090985 A1* | 7/2002 | Tochner | A63F 13/655 463/1 |
| 2002/0128056 A1* | 9/2002 | Kato | A63F 13/323 463/9 |
| 2003/0001882 A1* | 1/2003 | Macer | A63F 13/327 715/733 |
| 2003/0027634 A1* | 2/2003 | Matthews, III | A63F 13/12 463/39 |
| 2003/0036428 A1* | 2/2003 | Aasland | A63F 13/216 463/29 |
| 2003/0144047 A1 | 7/2003 | Sprogis | |
| 2003/0190956 A1 | 10/2003 | Vancraeynest | |
| 2003/0195044 A1* | 10/2003 | Narita | A63F 13/10 463/43 |
| 2004/0058732 A1 | 3/2004 | Piccionelli | |
| 2004/0259642 A1* | 12/2004 | Tanaka | A63F 9/24 463/42 |
| 2005/0049022 A1* | 3/2005 | Mullen | A63F 13/79 463/1 |
| 2005/0202861 A1* | 9/2005 | Dougherty | G06T 17/05 463/1 |
| 2005/0202862 A1* | 9/2005 | Shuman | A63F 13/63 463/9 |
| 2005/0202877 A1* | 9/2005 | Uhlir | A63F 13/65 463/43 |
| 2005/0203922 A1* | 9/2005 | Uhlir | A63F 13/65 |
| 2006/0105838 A1* | 5/2006 | Mullen | A63F 13/26 463/31 |
| 2006/0223635 A1* | 10/2006 | Rosenberg | A63F 13/332 463/37 |
| 2007/0060353 A1* | 3/2007 | Omori | A63F 13/795 463/39 |
| 2007/0225077 A1 | 9/2007 | Piccionelli | |
| 2008/0009349 A1* | 1/2008 | Wolfe | H04L 67/38 463/42 |
| 2008/0076578 A1* | 3/2008 | Tabata | A63F 13/12 463/42 |
| 2008/0076579 A1* | 3/2008 | Tabata | A63F 13/79 463/42 |
| 2008/0146338 A1* | 6/2008 | Bernard | A63F 13/10 463/42 |
| 2008/0167129 A1* | 7/2008 | Aaron | A63F 13/10 463/42 |
| 2008/0200261 A1* | 8/2008 | Spittle | A63F 13/798 463/43 |
| 2008/0311983 A1* | 12/2008 | Koempel | A63F 13/213 463/31 |
| 2008/0319656 A1* | 12/2008 | Irish | G01C 21/00 701/532 |
| 2009/0005140 A1* | 1/2009 | Rose | A63F 13/12 463/7 |
| 2009/0017913 A1* | 1/2009 | Bell | H04W 4/20 463/40 |
| 2009/0037526 A1* | 2/2009 | Elliott | H04W 4/029 709/203 |
| 2009/0106672 A1 | 4/2009 | Burstrom | |
| 2009/0170580 A1* | 7/2009 | Emalfarb | A63F 13/12 463/9 |
| 2009/0227374 A1* | 9/2009 | Tirpak | A63F 13/216 463/40 |
| 2010/0069148 A1* | 3/2010 | Cargill | A63F 13/65 463/25 |
| 2010/0087250 A1* | 4/2010 | Chiu | A63F 13/216 463/31 |
| 2010/0113161 A1* | 5/2010 | Walker | G07F 17/32 463/42 |
| 2010/0261519 A1* | 10/2010 | Zapata | A63F 1/04 463/22 |
| 2010/0271367 A1* | 10/2010 | Vaden | A63F 13/211 345/420 |
| 2010/0279768 A1 | 11/2010 | Huang et al. | |
| 2010/0287011 A1* | 11/2010 | Muchkaev | A63F 13/216 379/93.13 |
| 2010/0302143 A1* | 12/2010 | Spivack | A63F 13/216 345/157 |
| 2011/0107239 A1* | 5/2011 | Adoni | A63F 13/87 715/757 |

OTHER PUBLICATIONS

Written Opinion on corresponding PCT application (PCT/US2010/043567) from International Searching Authority (KR) dated Apr. 27, 2011.
'Sony Seeking GPS-Based PSP Games', http://multiplayerblog.mtv.com/2008/07/21/sony-seeking-gps-games/, 2008.
'Location Based Mobile Game', http://gpsmission.com/, Oct. 6, 2008.
'Triangler game', http://www.tno.nl/werkenjib/content.cfm?context=fascinotie_markten&, 2008.
'Outdoor GPS Multiplayer Game for Mobile Phones', http://tourality.com/facts/jsf, 2008.
'Our Games', http://gpsgames.org/, 2008.
Monopoly Tycoon Manual, Deep Red Games, Sep. 30, 2001.
U.S. Appl. No. 12/510,907, filed Jul. 28, 2009, Paul Reiche III, US 2011-0028220 A1, Office Action dated Jul. 21. 2011; Jun. 19, 2014; Mar. 17, 2015; May 26, 2016; Apr. 19, 2018; Jun. 21, 2019, Final Office Action dated Dec. 8, 2011; Sep. 28, 2015; Apr. 4, 2017, Notice of Allowance dated Feb. 4, 2020.

* cited by examiner

GPS RELATED VIDEO GAME

CROSS-REFERENCE TO RELATED APPLICATION

The present application is a continuation of U.S. patent application Ser. No. 12/510,907, filed Jul. 28, 2009, the disclosure of which is incorporated by reference herein.

BACKGROUND OF THE INVENTION

The present invention relates generally to video games, and more particularly to a video game utilizing real world location information.

Video games provide a source of entertainment for many. Video games often provide an interactive activity that can be interesting and challenging, and may allow game players to engage in simulated activities that may otherwise be unavailable. A possible disadvantage of video games is a lack of interaction with the broader physical world. Video game play is often centered about a specialized video game device or general purpose computer configured to provide video game play. Although some video game devices may be portable, the nature of video game play may prevent or inhibit interaction with a broader outdoor world.

BRIEF SUMMARY OF THE INVENTION

In one aspect of the invention, the invention provides a method for use with video game play, comprising: receiving an indication of a location of a mobile communication device; determining if a game play attribute is associated with the location of the mobile device; associating the game play attribute with a game player associated with the mobile device; receiving a request regarding the game play attribute; and affecting video game play based on the request.

In another aspect of the invention, the invention provides a system for use with video game play, comprising: network interface circuitry configured to receive data and transmit data over a network; at least one processor data coupled to the network interface circuitry and configured by program instructions to generate game play information based on information of received data and to command transmission of at least some of the game play information over the network, the program instructions including program instructions for associating an attribute with at least one game player based on received data indicative of game player location and employing the attribute in further game play.

These and other aspects of the invention are more fully comprehended upon review of this disclosure.

DETAILED DESCRIPTION

Figure 1:
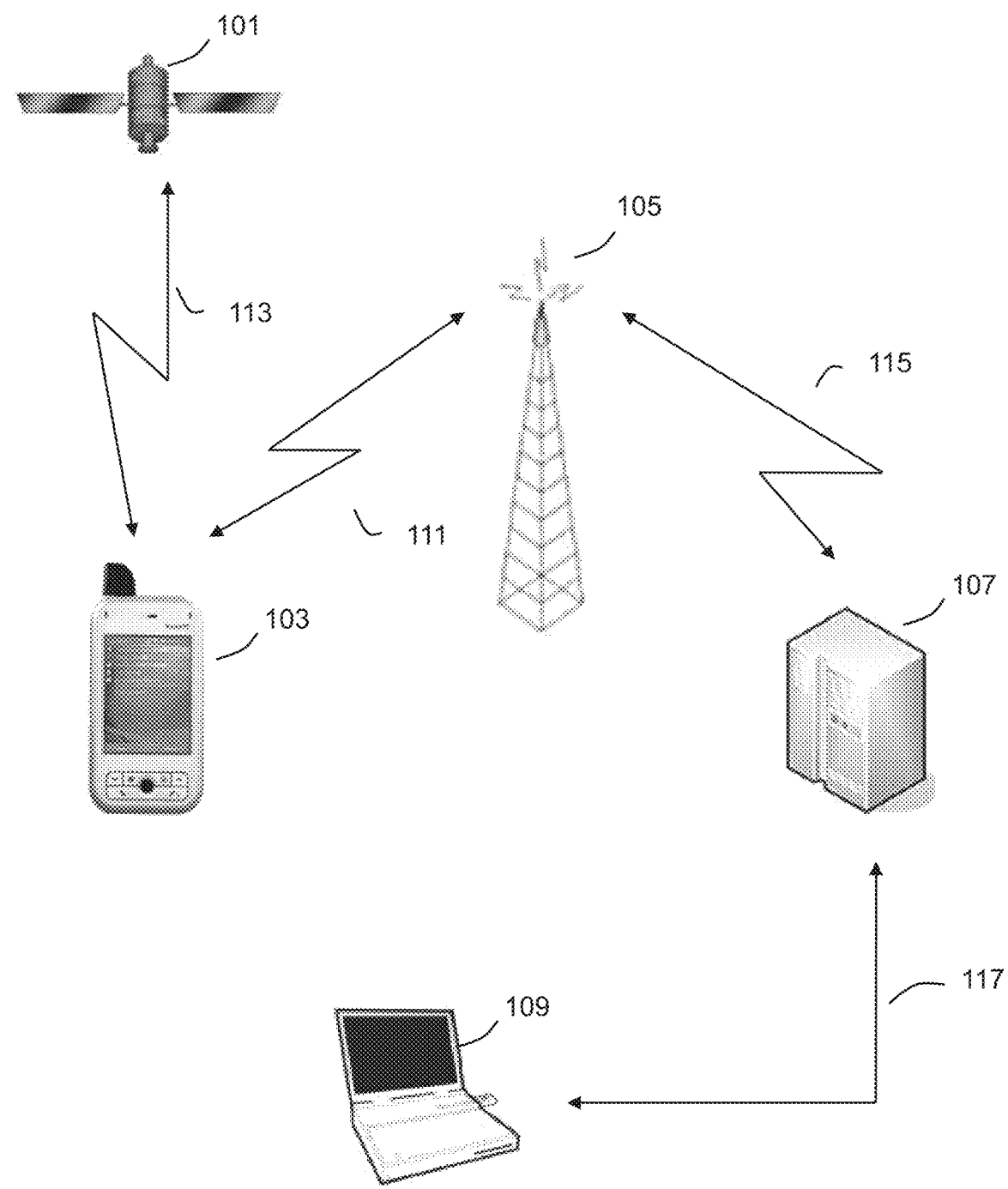
FIG. 1 illustrates an example of a satellite based mobile navigation/location game in accordance with aspects of the invention.

FIG. 1 illustrates an example of a system with a video game utilizing position information in accordance with aspects of the invention. As illustrated in FIG. 1, the system includes a positioning system satellite constellation 101 (represented by three satellites), mobile communications device 103, a cell site 105, a game server 107, and a personal computer (PC) 109. In various embodiments, other components, or fewer or additional components may be used. For example, in various embodiments special purpose game machines, for example, video game consoles, may be used instead of or in addition to PCs. In most embodiments, a plurality of mobile communications devices and PCs are part of the system of FIG. 1. The mobile communications devices are associated with game players, who may also utilize the PCs to participate in game play provided by the game server.

The game server includes circuitry to communicate over a network with the mobile communication device, for example via the cell site and through a connection 115. In some embodiments, the game server may comprise program instructions executing on a computer or a plurality of computers, a processor or processors of such computers, or in some embodiments, the game server may be considered the computer or computers themselves. The computer or plurality of computers typically includes one or more processors, memory, storage device, and may contain software applications and a database or database-like component. The one or more processors typically execute program instructions stored in memory or on the storage device related to the execution of a video game server related functions. The game server processes information from the mobile communications devices and/or PCs and provides video game data to the mobile communication devices and/or PCs. The database or database-like component may contain player information and attributes associated with players.

In operation in some embodiments, the server, for example by executing program instructions on the one or more processors, determines video game play information based on location information provided by the mobile communications device and game play related requests provided by the mobile communication devices and/or PCs, and commands transmission of at least some of the game play information to the mobile communications devices and/or PCs. For example, in some embodiments the server receives information of location of the mobile communications device and associates an attribute with a game player depending on the location of the mobile communication device, and possibly other criteria.

The attribute, for example, may be game play ownership of real property, and if the location of the mobile communicate device is in a particular building, the server may associate game play ownership of the real property including the building to the game player. Alternately, the attribute may be control of a tool or weapon, and if the location of the mobile communication device is at a particular location, the server may associate game play control of the tool or weapon with the game player. In such embodiments, in the context of the game, the tool or weapon may be considered to be "found" at the particular location. Further alternatively, the attribute may be game play control of an entity, and if the location of the mobile communication device is at a particular location, the server may associate game play control of the entity with the game player. In some embodiments the entity may be a monster of other character, and in the context of the game the monster may be considered as being "buried" at the particular location.

The server also receives requests to transfer the attribute and/or employ or use the attribute within game play, and affects game play based on the request. For example, if attribute is game play ownership of real property, the request may be a request to transfer game play ownership of the real property. Alternatively, the attribute may relate to a game play entity or item, and the request may be a request to have the entity or item be utilized, for example moved, within game play. For example, if the attribute is control of a tool or weapon, the request may be to use the tool or weapon in game play.

The mobile communication device determines a position of the mobile communications device and communicates with the game server. The mobile communication device may be uniquely associated with game player, or communications from the mobile communications device may specify that the mobile communications device is being used by a particular game player. The mobile communication device typically includes one or more processors, memory, and various interface circuitry. The mobile communication device includes circuitry, which may be in the form of a processor executing program instructions, for determining device position and providing data communications, in many instances including voice communications. Many cellular phones provide such functions, and in many embodiments, the mobile communications device may be a cell phone. In some embodiments, the circuitry may be capable of determining, on its own, a position of the device using received signals. In some embodiments, the circuitry for determining device position may perform part of the functions of determining position, while making use of processing performed by a remote system for performing other parts of the processing. In many embodiments, the circuitry for determining device position determines device position using Global Positioning System (GPS) information, provided for example by way of GPS satellites and the circuitry may include a GPS receiver and associated circuitry.

Figure 2:
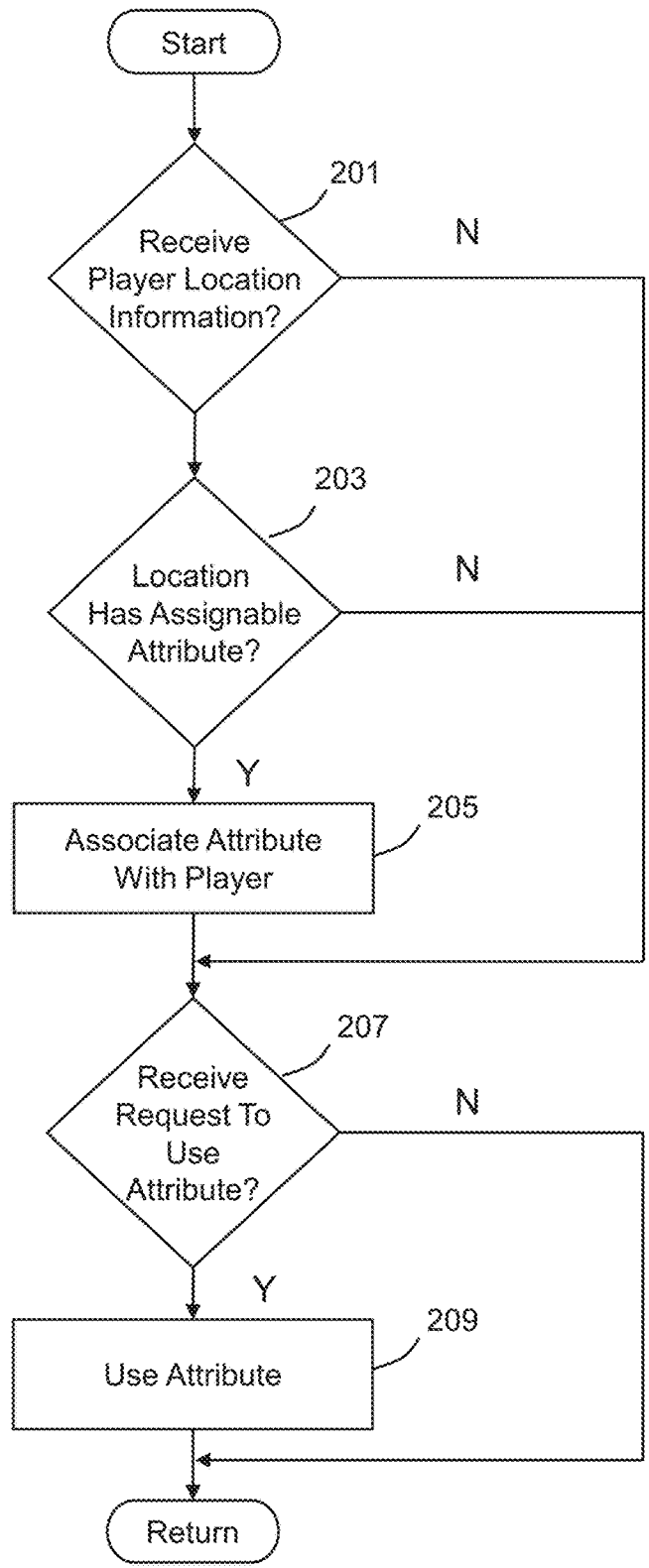
FIG. 2 is a flow diagram of a process of video game play in accordance with aspects of the invention.

The mobile communication device includes circuitry to communicate to or with the game server via a network. The communications may include, for example, an identifier and location of the mobile communication device. The communications may also include game play related requests, generally to the server, and game play information, generally from the server. The network may include a cellular network, for example as indicated in FIG. 2, with the mobile communications device communicating with the cellular network by way of a wireless connection 113. The cell site, or other portion of the cellular network may, for example, provides access to the Internet with the game server coupled to the Internet. In some embodiments, the wireless connection may utilize a Global System for Mobile communications (GSM) protocol, a Code Division Multiple Access (CDMA) protocol or a Time Division Multiple Access (TDMA) protocol. The cell site generally includes a tower or other elevated structure for mounting antennas, and one or more sets of transmitter/receivers transceivers, digital signal processors, and control electronics. In addition, in various embodiments, the cell site may not directly communicate with a mobile communication device, with, instead, communications with the mobile communication device being by way of a repeater interposed in a communication path between the cell site and the mobile communication device.

The PC, which is optional in may embodiments, includes circuitry to communicate with the game server through a connection 117. The communications generally include game status information from the game server and game play requests from the PC. In many embodiments, the connection may include the Internet. In some embodiments, the PC may be in the form of a laptop or notebook computer, although in some embodiments, the PC may be in the form of a desktop computer. The PC typically includes one or more processors, memory, storage device, graphics chip, input devices, display and may contain software applications. In many embodiments, the input devices may be in the form of a keyboard and mouse, although in some embodiments, the input devices may include other devices such as a joystick, game pad, touchscreen, or other controllers. The one or more processors execute program instructions loaded in memory or on the storage device related to the execution of a video game and commands the graphics chip to generate video game graphics to be output to the display.

FIG. 2 is a flow diagram of a process for use in providing video game play in accordance with aspects of the invention. In some embodiments, the process may be performed by the server of FIG. 1. In block 201, the process determines if player location information has been received. In many embodiments, player location information may be determined by a GPS-capable device, which determines the player's location by performing calculations using GPS satellite broadcast signals. In some embodiments, player location information may be received by a game server from a mobile communication device such as a cell phone or PDA with GPS or GPS-like functionality. In some embodiments, the request is received through a wireless connection utilizing GSM, CDMA, or TDMA protocol. In some embodiments, for example, player location information from the mobile communication device is received by the game server by way of a communications network.

In some embodiments, the mobile communications device may also send a request to associate with the player an attribute associated with the location of the mobile communication device. Typically, a player may cause the mobile communications device to transmit a request from a location expected to have an assignable attribute. In some embodiments, parks, libraries, and other public areas may be expected to have an assignable attribute. In some embodiments private establishments may be expected to have assignable attributes. For example, a chain of restaurants may participate in a promotion where each restaurant location may have an assignable attribute or various locations within a theme or amusement park may have an assignable attribute. In some embodiments, all locations, including both public and private locations, may have assignable attributes. If player location information is received, the process proceeds to block 203. Otherwise, the process proceeds to block 207.

In block 203, the process determines if the location has an assignable attribute. In some embodiments, all locations have an assignable attribute. The assignable attribute generally relates to game play, and may be used or otherwise relate to further game play. For example, the attribute may be game play ownership of real property (and/or any structures built on or located at the real property) comprising the location, with the game play ownership of the real property useful or able to be used in further game play. Also, for example, the game play attribute may be an entity such as a game character or an item such as an item that may be used or useful to a game character, for example a tool or a weapon. In some embodiments, the attribute may be used to enhance a game character of the player using the attribute. If the process determines that the player location has an assignable attribute, the process proceeds to block 205. Otherwise, the process proceeds to block 207.

In block 205, the process assigns the attribute associated with the location to the player. In some embodiments, the attribute may be assigned to a single player. In some embodiments, the attribute may be assigned to a group of players. For example, in some embodiments where players may form groups, if player 1 is a member of group X, the attribute may be assigned to all the members of group X. In some embodiments, an attribute may be exchanged for other attributes with other players. For example, after player 1 has been assigned attribute C, player 1 may exchange attribute C for attribute D from player 2. However, in some embodiments, attributes may not be exchanged between players.

In some embodiments, an attribute may only be assignable if it has not previously been assigned. For example, if a player 1 is assigned an attribute associated with location A, other players at location A at a later time will not be assigned the attribute. In some embodiments, an attribute may be assignable to a limited number of players. For example, the first five players at location B may be assigned the attribute associated with location B, however any further players at location B, for example at a later time, may not be assigned the attribute. In some embodiments, a player may not be assigned the same attribute more than once. For example, if player 1 has attribute A and player 1 is at a location A associated with attribute A, player 1 may not be assigned an additional attribute A. However, in some embodiments, a player may be assigned the same attribute a predetermined number of times. For example, if player 2 has attribute B and player 2 is at a location B associated with attribute B, player 2 may be assigned an additional attribute B.

In block 207, the process determines if a request to use an attribute is received. In some embodiments, the request to use an attribute may be received by a game server from a mobile communication device such as a cell phone or PDA. In some embodiments, the request may be received by the game server, for example, through an Internet connection, from a PC. In some embodiments, a request to use an attribute may include player identification information, a use request, and in some embodiments a player location. In embodiments in which the attribute is game play ownership of real property (and/or structures built on or located at the real property), the use request may be a request to transfer ownership of the real property, for example for game play consideration from another game player or otherwise. In embodiments in which the attribute is a game character, for example, a monster, or game item, for example a tool or a weapon, the request may be to employ the attribute in a certain way, for example, by movement or use of the attribute. For example, in some embodiments where the attribute is a weapon, the player may request that the weapon be used, for example, by a game character of the game player, to attack another player. If the process determines that it received a request to use an attribute, the process continues to block 209. Otherwise, if the process does not receive a request to use an attribute, the process returns.

In block 209, the process affects game play based on the request. In some embodiments, attributes may be used in interactions with other game players.

Figure 3:
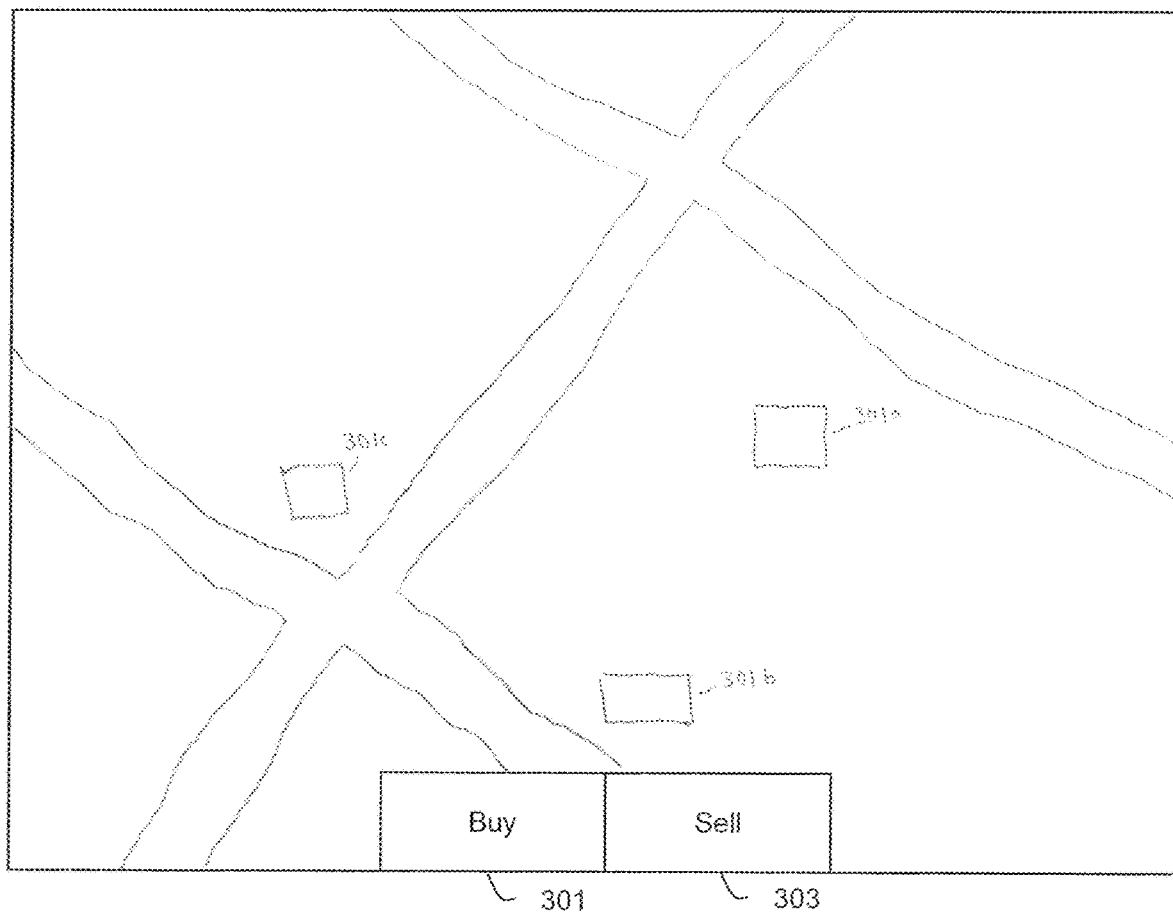
FIG. 3 illustrates an example screenshot of game play of a real property related video game in accordance with aspects of the invention.

FIG. 3 illustrates an example screenshot of game play of a real property related video game in accordance with aspects of the invention. The screenshot may be, for example, a screenshot for a display associated with a PC or mobile communications device utilized by a game player. Information used to generate the screenshot is provided, either in whole or in part, by a server performing game functions. In the particular screenshot of FIG. 3, the display includes a map of an area, with indicators showing various properties in the area and a toolbar which allows a player to perform various video game functions. The indicators may include the identity of a player or group of players associated with the area of land and or other properties, such as indicator indicating that a property is for sale. For example, as illustrated in FIG. 3, the certain areas 301*a-c* may indicate properties which are for sale by other players. The toolbar in FIG. 3 is generally positioned at the bottom of the game play screen; however the toolbar may be positioned along other areas of the display. As shown in FIG. 3, the toolbar includes a "Buy" 303 and a "Sell" 305 option. In various embodiments, the toolbar may include other and/or additional components, as may be beneficial for game play.

As an example, during video game play a game player may generally perform various game tasks by clicking on areas on the map and/or buttons on the toolbar. For example, a player may click and select a property on the map and click a "Display" button (not shown) on the toolbar. An informational window may appear next to the property displaying various attributes of the property. For example, the display may include the identity of the player and/or group of players associated with the property, the size of the property, the value of the property, when the property was acquired, and possibly other details of the property.

In some embodiments, a player may click and select a property on the map and click the "Buy" button on the toolbar. An informational window may be displayed and if the area of land is currently marked as for sale, a request may be sent to a game server to purchase the property. Otherwise if the property is not currently marked as for sale, a buy request may be sent to, the game server, or alternatively, to another game player without necessarily being sent to the game server, the player associated with the property.

In some embodiments, a player may click and select a property on the map and click the "Sell" button on the toolbar. An informational window may appear allowing the player to select a price and setting other conditions relating to the sale. Upon completion, a request to sell the property is sent to the game server, which provides information to game players such that, the property will be displayed with a "For Sale" indicator on the map.

In some embodiments, the map may include indicators showing players or groups of players currently at locations on the map. For example, the map may display an indicator showing that player 3 is currently at property A on the map. In some embodiments, the map may include indicators showing player actions at the properties on the map. For example, the map may display an indicator showing that player 4 is currently at property C on the map and attempting to acquire property C. A player may use such information to determine further game actions. For example, player 5 may see that player 3 is moving towards property D. Player 5 may believe that player 3 will attempt to acquire property D, therefore player 5 may attempt to arrive at property D before player 3 to acquire the property. In addition, in some embodiments, multiple players may arrive at a location, and submit a request to take or transfer game play ownership of the property.

Figure 4:
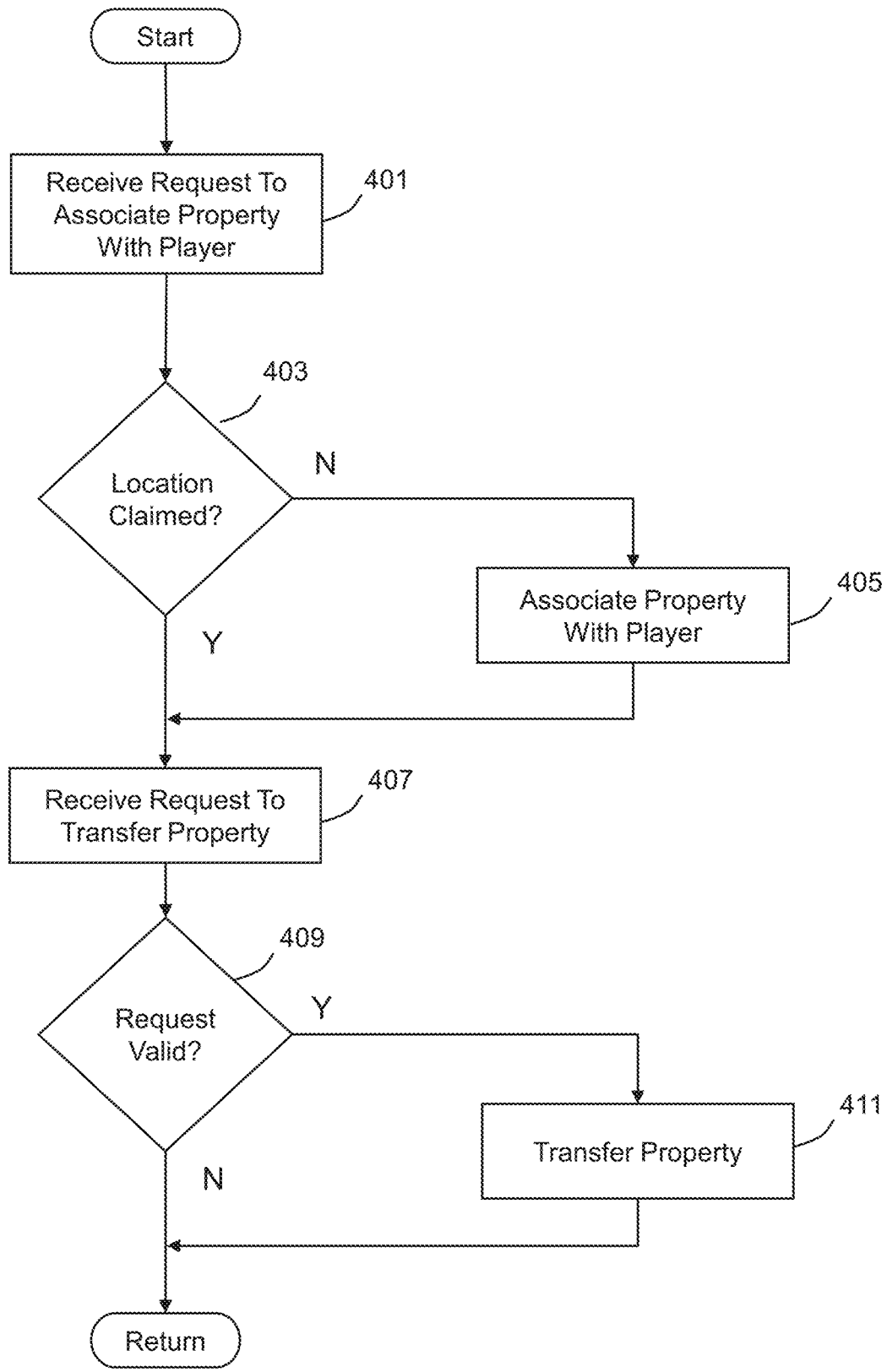
FIG. 4 is a flow diagram of a process of game play of a real property related video game in accordance with aspects of the invention.

FIG. 4 is a flow diagram of an example process of game play of a real property related video game in accordance with aspects of the invention. The process may be performed, for example, by the server of FIG. 1. In block 401, the process receives a request to associate a property with a player. In many embodiments, the request may be initiated by a player at the real property location. In many embodiments, the request may include player location information determined by a GPS-capable communications device.

In block 403, the process determines if the property has already been claimed. In many embodiments, a property may be claimed once a player sends a request to associate the property with the player. In some embodiments, a property may be claimed by a plurality of players. For example, in some embodiments, game players may form groups and a player may claim a property as a member of a group. The property may be claimed by the player and other players belonging to the group. In many embodiments, a game server may have a database or a database-like component which stores player/property associations. To determine if a property has been claimed, the game server may query the database or database-like component storing player/property associations using the player real property location information received in block 501. If the database contains information indicating a player or group is associated with the property, the property is claimed. For example, the database query may indicate that player 1 is associated with property X, therefore property X is claimed by player 1. Alternatively, if no player or group is associated with the location, the location is unclaimed. If the process determines that the property has been claimed, the process proceeds to block 407. Otherwise, if the property has not been claimed, the process proceeds to block 405.

In block 405, the process assigns the property to the player or group of players. In most embodiments, the process stores for example in a database, an indication that the property is assigned to the player or group of players. In some embodiments, a property may be bought, sold, or exchanged for other properties with other players. For example, after player 1 has been assigned property A, player 1 may exchange property A for property B from player 2. However, in some embodiments, properties may not be exchanged between players.

In block 407, the process may receive a request to transfer the property. In some embodiments, the request may be received by the game server from a player's mobile communications device. In some embodiments, the request may be received by the game server from a player's PC. In some embodiments, the request may include transferor player identification information, transferee player identification information, and property information. In some embodiments, property information may include the location of the property, the size of the property, and the value of the property.

In some embodiments and in embodiments where players may form groups of players and properties may be claimed by a group of players, a property already associated with a player or a group of players may be transferred to a larger group of players if a request to claim the property is received from each member of the larger group of players within a set period of time. For example, a property previously associated with a group of 5 players may be transferred to a group of 10 players if a request to claim the property is received from each member of the group of 10 players.

In block 409, the process determines if the request is valid. In some embodiments, the request may be valid if property to be transferred is associated with the transferring player. A player may not initiate a transfer of property associated with another player. In some embodiments, properties may have restrictions and requirements for transfer. For example, in some embodiments, a player may not transfer a property unless the player has at least two associated properties. In some embodiments, some properties may not be transferred. For example, a player may not transfer a first or default property associated with the player. In some embodiments, the process may compare the information included in the request received in block 407 with information stored in the game server database to determine if the request is valid.

In block 411, the process transfers the property. In many embodiments, a player may transfer a property associated with the player to another player in exchange for game currency. In some embodiments, the transferee may receive the property and the transferor may receive game currency. In some embodiments, the game currency may be exchanged for real world currency or special promotional items. Alternatively, in some embodiments, real world currency may be exchanged for game currency. In some embodiments, property may be transferred without game currency. For example, a player may transfer a property to another player in exchange for other property or other game attributes.

Figure 5:
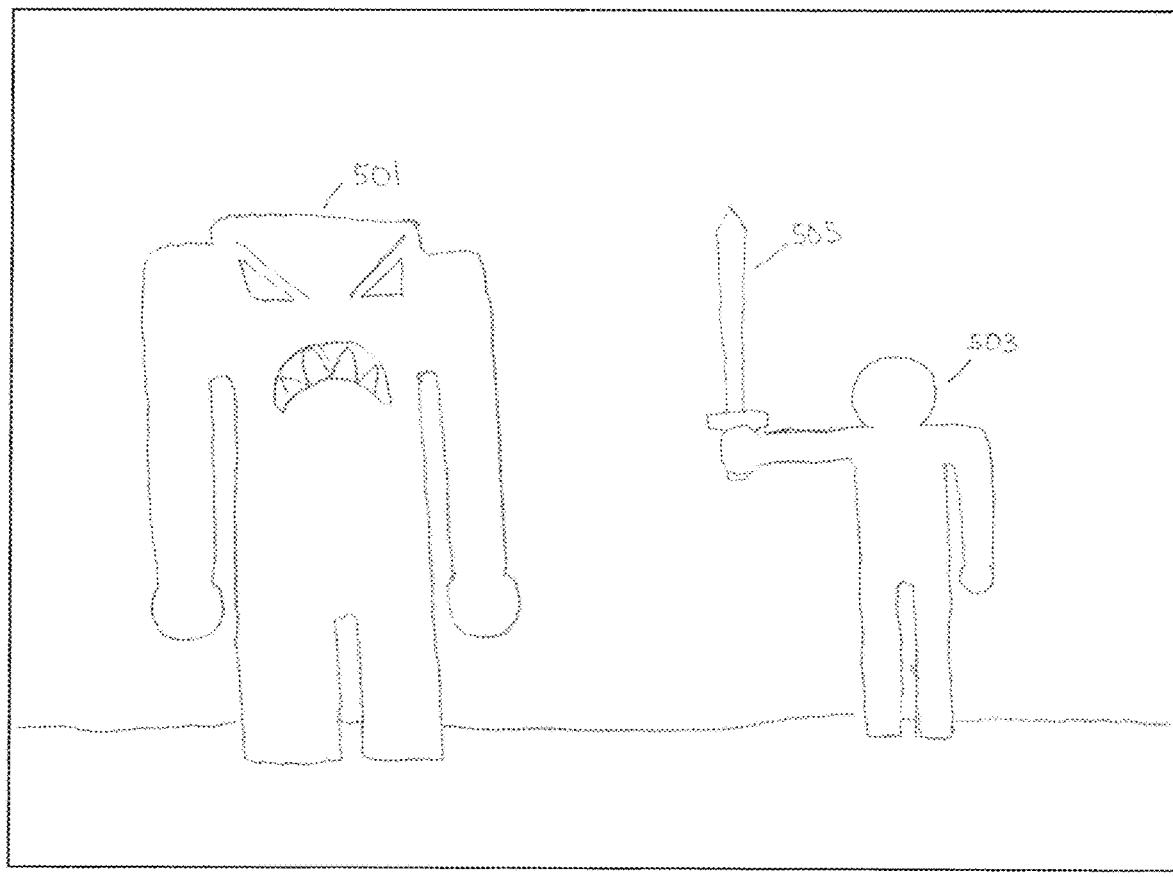
FIG. 5 illustrates an example screenshot of game play of a battle related video game in accordance with aspects of the invention.

FIG. 5 illustrates an example screenshot of game play of a battle related video game in accordance with aspects of the invention. The screenshot is, for example, from a display for a PC or other game machine of a game player. Information used in generating the screenshot may be provided, in whole or in part, by a game server. In the screenshot of FIG. 5, the display includes a game character 503 in a battle with an entity 501. The game character wields a sword 505, an attribute in the form of an item associated with a game player in control of the game character.

In some embodiments, during video game play, a game player may use attributes in the form of items, for example tools or weapons, and entities, for example monsters, associated with the game player. For example, as illustrated in FIG. 5, a first player commands, for example by having the first game player's PC send requests to a game server, the game character to use a sword associated with the player to perform various game attacks against the entity. In some embodiments, the entity may be associated with a second game player. The second game player may command the entity to perform various game attacks against the first player. In many embodiments, the commands are provided to the game server, and the game server determines outcomes of the commands and status of game play, with the game server providing the status of game play to the game players' machines for displaying or displays associated with the machines.

Figure 6:
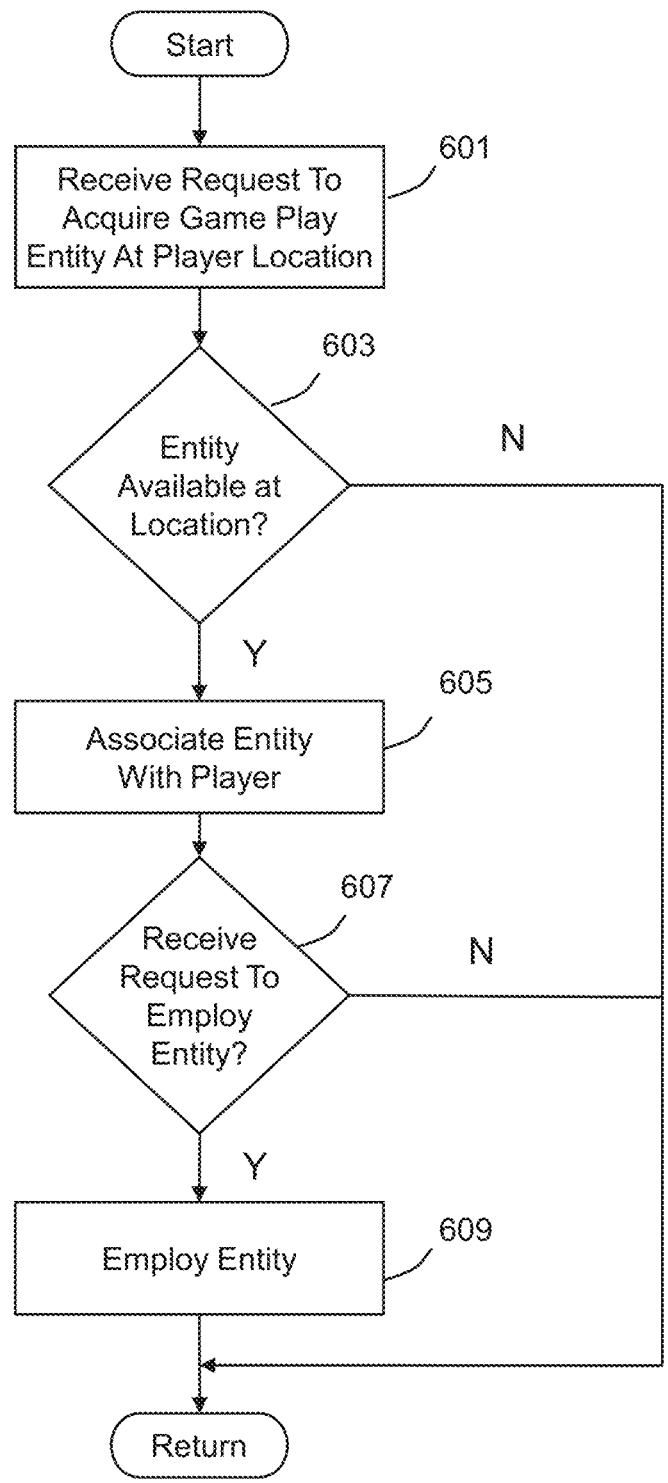
FIG. 6 is a flow diagram of a process of game play of a battle related video game in accordance with aspects of the invention.

FIG. 6 is a flow diagram of an example process of game play of a battle related video game in accordance with aspects of the invention. The process may be performed, for example, by the server of FIG. 1. In block 601, the process receives a player request to acquire an entity at a location. The entity may be a monster or some other game character, for example a game character of a type found in other video games. In many embodiments, the request may be initiated by a player at the real property location. In many embodiments, the request may include player location information determined by a GPS-capable communications device.

In block 603, the process determines if an entity is available to be acquired at the player location. In some embodiments, an entity of some type may be acquired at all player locations. In some embodiments, entities may only be acquired at designated locations. In some embodiments, the entity acquired at any location is random. In some embodiments, the entity acquired at a location may be predetermined. In some embodiments the entity acquired at a particular location may always be the same entity. For example, the entity acquired at location X is always entity A. In some embodiments, the entity acquired at a location may be different depending on the time. For example, at 10:00 am, the entity acquired at location Y may be entity B and at 12:00 pm, the entity acquired at location Y may be entity C. In some embodiments, the entity acquired at a location may be different depending on the player's attributes. For example, the entity acquired at location Y by a player on level 5 may be entity C and the entity acquired at location Y by a player on level 50 may be entity D. In some embodiments, once an entity at a location has been acquired by a player, no entity may be later acquired at that location. To determine what entity may be acquired at a designated location, the game server may query the database or database-like component storing entity/location associations using the player location information received in block 701. In some embodiments the entities' attributes may be determined by the location where entities were acquired. For example, a water-based entity acquired at a lake or a Fire Station may be particularly effective against a fire-based entity. If an entity is available to be acquired at the player location, the process proceeds to block 605. Otherwise, if no entity is available to be acquired at the player location, the process returns.

In block 605, the process associates the entity with the player. In many embodiments, players may use entities associated with that player in a video game; for example, a video game played on a PC. In some embodiments, the video game allows a player to collect a plurality of entities associated with the player.

In block 607, the process determines if a request to employ the entity is received. For example, the request may be to have the entity take a defined action, to move about in a certain direction, or do some particular task. In some embodiments, the request may be received by the game server from a player's mobile communications device. In some embodiments, the request may be received by the game server from a player's PC. In some embodiments, the request may include the employing player's identification information, the identification information of a player for which the entity may be employed on or against, and entity information. In some embodiments, entity information may include the attributes of the entity and the value of the entity. If a request to employ the entity is received, the process proceeds to block 609. Otherwise, the process returns.

In block 609, the entity is employed. In some embodiments, a player may employ an entity to battle other game entities. For example, in some embodiments and as illustrated in FIG. 5, the entity may be a monster which the player may control in a battle with other game players or other entities. In some embodiments, the player may choose a form of attack by the monster entity. In some embodiments, the monster entity may attack automatically without input from the player. In some embodiments, the entity may be a game item employed in battle against other game players or other entities. For example, in some embodiments and as illustrated in FIG. 5, the entity may be a sword used by the player's game character in a battle with a monster entity. In some embodiments, entities may be acquired during battles. For example, the winning player may acquire the losing player's entities. In some embodiments, entities may not be acquired during battles. In some embodiments, entity attributes may be altered. For example, the winning player's entity or entities may increase in overall effectiveness and the losing player's entity or entities may decrease in overall effectiveness. In some embodiments, entity attributes may be constant and unaffected by the outcome of battles.

In some embodiments, players may buy, sell, and trade entities with other players. For example, a player may buy an entity from another player for an amount of game currency. Alternatively, a player may sell an entity to another player for an amount of game currency. In some embodiments, game currency may be earned through game play. In some embodiments, game currency may be bought using real world currency.

Accordingly, aspects of the invention provide music based video game related systems and methods. Although the invention has been discussed with respect to various embodiments, it should be recognized that the invention comprises the novel and non-obvious claims supported by this disclosure.

The invention claimed is:

1. A method for use with video game play in a video game, comprising:
   determining, by GPS circuitry of a mobile communication device, an indication of a location of the mobile communication device, the mobile communication device being associated with a game player;
   determining that a game character may be acquired at the location of the mobile communication device, based on information of game character/location associations accessible to a server;
   associating the game character, indicated by the information of game character/location associations, with the game player associated with the mobile communication device;
   providing video game play control, within the video game, to the game player associated with the mobile communication device of the game character; and
   employing the game character in the video game in a battle with at least one other game character, based on input to the mobile communication device provided by the game player.

2. The method of claim 1, wherein the input to the mobile communication device indicates a form of attack.

3. The method of claim 1, wherein a plurality of game characters, including the game character, are associated with the game player associated with the mobile communication device.

4. The method of claim 3, wherein a request to employ the game character includes information of the game character.

5. The method of claim 1, wherein the at least one other game character is a game character associated with a second game player.

6. The method of claim 5, further comprising associating the game character of the second game player with the first game player in response to the game character associated with the game player winning the battle.

7. The method of claim 1, wherein the information of game character/location associations changes over time.

8. The method of claim 1, further comprising determining which of a plurality of game characters may be acquired at the location of the mobile communication device.

9. The method of claim 1, further comprising altering attributes of the game character based on an outcome of the battle.

10. The method of claim 9, wherein effectiveness of the game character is increased in response to the game character winning the battle.

11. The method of claim 1, wherein the determining that the game character may be acquired at the location of the mobile communication device is further based on an attribute associated with the game player.

12. The method of claim 11, wherein the attribute associated with the game player is a game play level.

\* \* \* \* \*